(12) United States Patent
Lee (10) Patent No.: US 9,039,270 B1
(45) Date of Patent: May 26, 2015

(54) BACKLIGHT MODULE AND DISPLAY DEVICE

(71) Applicant: Au Optronics Corporation, Hsinchu (TW)

(72) Inventor: Keng-Yi Lee, Nantou County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/265,364

(22) Filed: Apr. 30, 2014

(30) Foreign Application Priority Data

Nov. 12, 2013 (TW) .............................. 102141087 A (51) Int. Cl.
*F21V 8/00* (2006.01)
(52) U.S. Cl.
CPC ..................... *G02B 6/0083* (2013.01)
(58) Field of Classification Search
USPC ................ 362/632, 633, 634, 630, 631, 97.1
See application file for complete search history.

(56) References Cited

FOREIGN PATENT DOCUMENTS

| CN | 101561101 | 10/2009 |
|---|---|---|
| CN | 103148404 | 6/2013 |
| CN | 103235438 | 8/2013 |
| TW | I377398 | 11/2012 |
| TW | I414851 | 11/2013 |

*Primary Examiner* — Laura Tso
(74) *Attorney, Agent, or Firm* — Jianq Chyun IP Office (57) ABSTRACT

A backlight module and a display device are provided. The backlight module includes a light guide, a bottom frame, and a first light bar. The light guide has a first light incident surface. The bottom frame has a clip portion, a first hole, and a first tongue piece, wherein the light guide is disposed in the bottom frame and clipped by the clip portion. A driver board is locked to the first tongue piece, and the first tongue piece is folded from the first hole. The first light bar is disposed between the first light incident surface of the light guide and the bottom frame, and the first light bar has a first connector. The first connector passes through the first hole, so that the first connector is outside the bottom frame.

14 Claims, 6 Drawing Sheets

BACKLIGHT MODULE AND DISPLAY DEVICE

CROSS-REFERENCE TO RELATED APPLICATION

This application claims the priority benefit of Taiwan application serial no. 102141087, filed on Nov. 12, 2013. The entirety of the above-mentioned patent application is hereby incorporated by reference herein and made a part of this specification.

TECHNICAL FIELD

The disclosure relates to a backlight module and a display device, and more particularly to a side-light backlight module and a display device having the side-light backlight module.

BACKGROUND

A display module having non-self-luminous display requires a backlight module to provide light source required for display. The backlight module is primarily composed of a light source, a light guide and a bottom frame. Take a side-light backlight module for example, a light bar is generally used as the light source, and the light bar is accommodated in the bottom frame of the side-light backlight module. In general, the bottom frame has a plurality of cable holes having a fixed width, so that a connector of the light bar is able to pass through the corresponding cable hole to connect to other external circuits.

However, the cable hole reduces the structural strength of the bottom frame. More specifically, it is easy for the bottom frame to have cracks at cable hole, which affects the service life of the backlight module. Therefore, it is indeed an important issue to enhance the structural strength of the bottom frame.

SUMMARY

A backlight module is provided, which has favorable structural strength.

A display device is provided, wherein the backlight module thereof has favorable structural strength.

A backlight module includes a light guide, a bottom frame and a first light bar. The light guide has a first light incident surface. The bottom frame has a clip portion, a first hole, and a first tongue piece, wherein the light guide is disposed in the bottom frame and clipped by the clip portion. A driver board is locked to the first tongue piece, and the first tongue piece is folded from the first hole. The first light bar is disposed between the first light incident surface of the light guide and the bottom frame, and the first light bar has a first connector. The first connector passes through the first hole, so that the first connector is outside the bottom frame.

In an embodiment, the first connector has a first width. The first hole has a first diagonal width, and the first diagonal width is greater than or equal to the first width.

In an embodiment, the first tongue piece has a screw hole, and the first connector on the first tongue piece does not overlap with the screw hole in an orthogonal projection.

In an embodiment, the first tongue piece has a screw hole, and a circuit of the first connector on the first tongue piece does not overlap with the screw hole in an orthogonal projection.

In an embodiment, the bottom frame further includes a second hole and a second tongue piece, wherein the driver board is locked to the second tongue piece, and the second tongue piece is folded from the second hole. The first light bar has a second connector, and the second connector passes through the second hole, so that the second connector is outside the bottom frame.

In an embodiment, the backlight module further includes a second light bar, wherein the light guide further has a second light incident surface, and the first light incident surface and the second light incident surface are at two opposite sides of the light guide. The bottom frame further has a second hole and a second tongue piece, and the driver board is locked to the second tongue piece. The second tongue piece is folded from the second hole, the second light bar has a second connector, and the second connector passes through the second hole, so that the second connector is outside the bottom frame.

In an embodiment, the light guide further has a light-emitting surface and a bottom surface opposite to each other, wherein the first light incident surface is adjacent to the light-emitting surface and the bottom surface, and the first hole is at the bottom surface.

In an embodiment, the light guide further has a light-emitting surface and a bottom surface opposite to each other, wherein the first light incident surface is adjacent to the light-emitting surface and the bottom surface, and the first hole is at the light-emitting surface.

A display device includes the backlight module, a display module, and a front frame. The display module is disposed on the backlight module, the driver board is electrically connected to the display module, and the backlight module is between the driver board and the display module. The front frame is assembled with the bottom frame and covers the periphery of the display module.

A display device includes a backlight module, a display module, and a driver board. The backlight module includes a light guide, a bottom frame, and a first light bar. The light guide has a light incident surface and a light-emitting surface adjacent to each other. The bottom frame has a clip portion, a first tongue piece and a first hole. The first tongue piece is folded from the bottom frame to form the first hole. The first tongue piece is connected to the clip portion, and the first tongue piece extends away from the clip portion. The first light bar has a flexible circuit board, a light source and a first connector. The flexible circuit board has a main body and an extending portion connected to each other. The light source is disposed on the main body, and the first connector is at the extending portion. The display module is disposed on the backlight module, and the driver board is electrically connected to the display module and disposed on the first tongue piece. The main body is disposed inside the clip portion, and the extending portion is disposed on the first tongue piece.

In an embodiment, part of the extending portion is accommodated in the first hole, so that the first connector is outside the bottom frame.

In an embodiment, the first hole matches the outer contour of the first tongue piece.

In an embodiment, the extending portion is between the tongue piece and the driver board.

In an embodiment, the extending portion on the first tongue piece is overlapped with the driver board on the first tongue piece in an orthogonal projection.

Based on the above, the backlight module adopts the first hole formed when forming the first tongue piece as a cable hole, so that the bottom frame does not require an additional hole as the cable hole. Thereby, the number of holes on the bottom frame is effectively reduced so that the backlight module has favorable structural strength. In addition, adopting the backlight module having favorable structural strength in the display device further enhances the reliability of the display device.

To make the above features and advantages of the present disclosure more comprehensible, several embodiments accompanied with drawings are described in detail as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
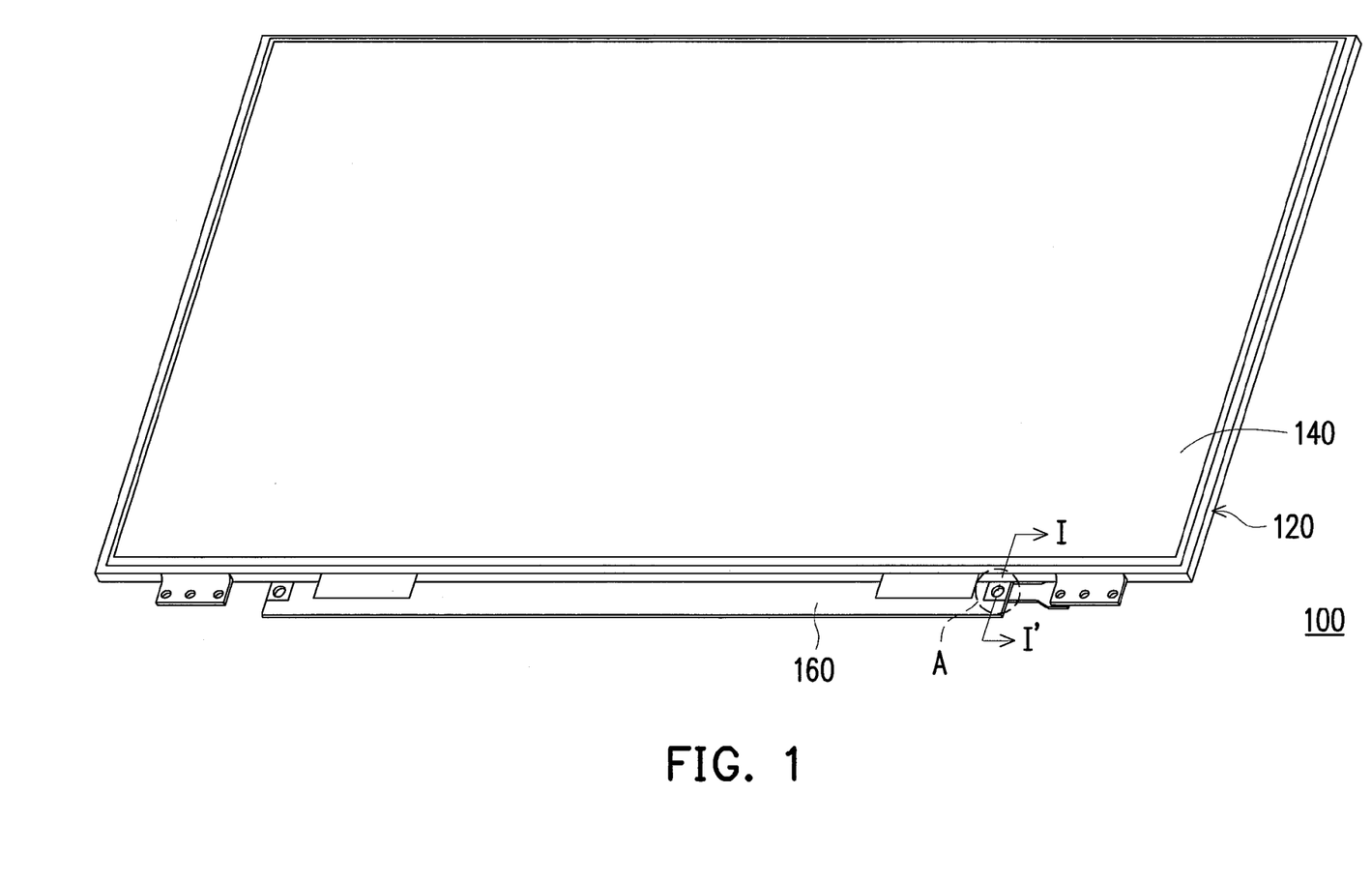
FIG. 1 is a schematic view of a display device according to an embodiment.
Figure 2:
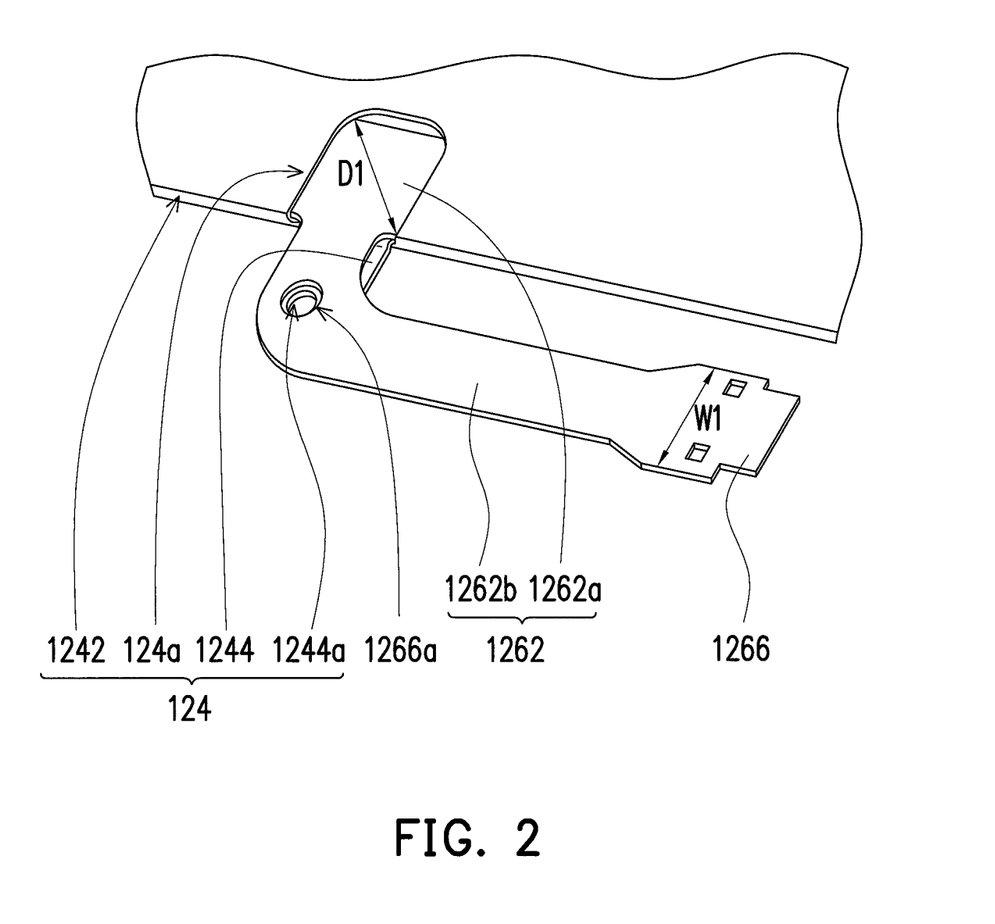
FIG. 2 is a partially enlarged diagram of an area A in FIG. 1.
Figure 3:
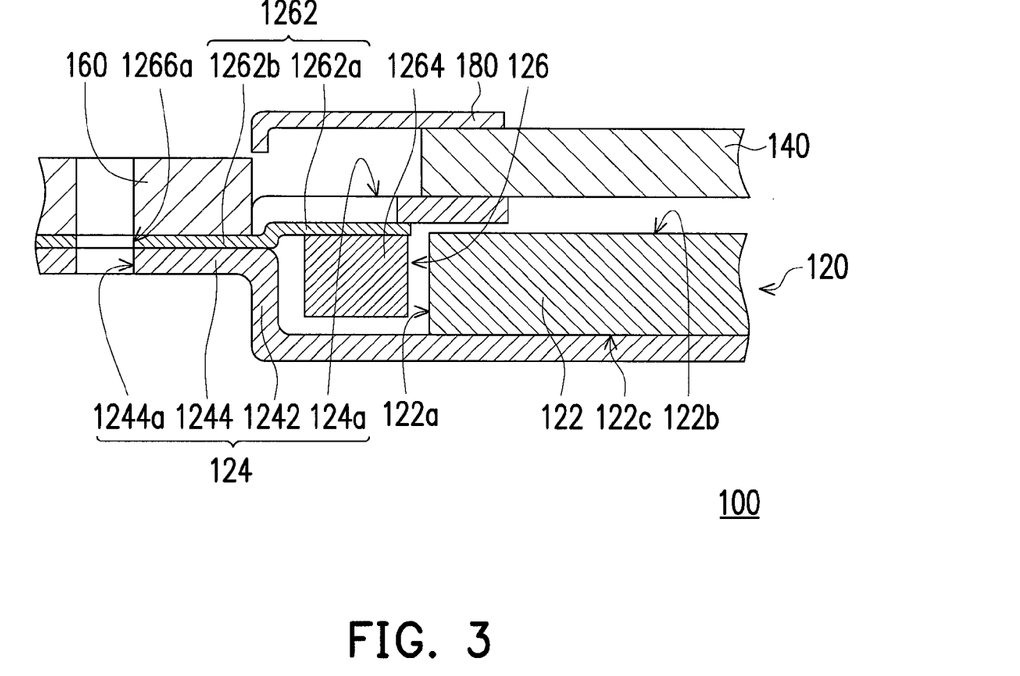
FIG. 3 is a schematic cross-sectional view taken along a line I-I' in FIG. 1.

FIG. 1 is a schematic view of a display device according to an embodiment. FIG. 2 is a partially enlarged diagram of an area A in FIG. 1. FIG. 3 is a schematic cross-sectional view taken along a line I-I' in FIG. 1. To make the figures clear, a certain components are omitted in the schematic view of FIG. 1 and the enlarged diagram of FIG. 2. Referring to FIGS. 1 to 3, a display device 100 includes a backlight module 120, a display module 140, a driver board 160 and a front frame 180. In the present embodiment, the display module 140 is, for example, a liquid crystal display module. The backlight module 120 is, for example, a side-light backlight module for providing a light source required by the display module 140 for display. The backlight module 120 includes a light guide 122, a bottom frame 124 and a first light bar 126. The light guide 122 has a light incident surface 122a and a light-emitting surface 122b adjacent to each other. The bottom frame 124 has a clip portion 1242, a first tongue piece 1244 and a first hole 124a. A driver board 160 is locked to the first tongue piece 1244, and the first tongue piece 1244 is folded from the bottom frame 124 to form the first hole 124a. The first tongue piece 1244 is connected to the clip portion 1242. The first tongue piece 1244 extends away from the clip portion 1242, such as a direction away from the light guide 122 in FIG. 3. The front frame 180 is assembled with the bottom frame 124 and covers the periphery of the display module 140.

The first light bar 126 has a flexible circuit board 1262, a light source 1264 and a first connector 1266. The flexible circuit board 1262 has a main body 1262a and an extending portion 1262b connected to each other. The light source 1264 is disposed on the main body 1262a, and the first connector 1266 is disposed on the extending portion 1262b. In the present embodiment, the light source 1264 is, for example, a light-emitting diode, and after the emitted light enters the light guide 122 from the light incident surface 122a, the light departs from the light guide 122 from the light-emitting surface 122b and enters the display module 140. The display module 140 is disposed above the backlight module 120, and the driver board 160 is electrically connected to the display module 140 and disposed on the first tongue piece 1244. The backlight module 120 is between the driver board 160 and the display module 140. The driver board 160 drives the display module 140 to generate display images. The main body 1262a of the flexible circuit board 1262 is disposed inside the clip portion 1242, and the extending portion 1262b is disposed on the first tongue piece 1244.

In the present embodiment, the first tongue piece 1244 is folded from the bottom frame 124 to form the first hole 124a, wherein the driver board 140 is screwed to the first tongue piece 1244, and the first hole 124a serves as a cable hole for the flexible circuit board 1262, so that the first connector 1266 at the end of the flexible circuit board 1262 passes through the first hole 124a to connect to other external circuits. Adopting the first hole 124a formed as the cable hole when folding the bottom frame 124 to manufacture the first tongue piece 1244, the bottom frame 124 does not require an additional hole as the cable hole. Thereby, the number of holes on the bottom frame 124 is effectively reduced so that the backlight module 120 has favorable structural strength.

The frame 124 of the present embodiment is formed integrally. For instance, the bottom frame 124 is cut when forming the first tongue piece 1244, and the cut portion is folded to make the first tongue piece 1244 and forms the first hole 124a after being folded. Thereby, the first hole 124a matches the outer contour of the first tongue piece 1244. In addition, in the present embodiment, the light guide 122 further has a bottom surface 122c, and the bottom surface 122c is opposite to the light-emitting surface 122b. The first light incident surface 122a is adjacent to a light-emitting surface 122b and the bottom surface 122c. In the present embodiment, the first hole 124a is at the light-emitting surface 122b. In other words, the first tongue piece 1244 is folded from the light-emitting surface 122b toward a direction away from the clip portion 1242, such as a direction away from the light guide 122 in FIG. 3.

In the present embodiment, the first connector 126 has a first width W1, and the first hole 124a has a first diagonal width D1, wherein the first diagonal width D1 is larger than or equal to the first width W1. Thereby, it could be avoided that the first diagonal width D1 is too small to allow the first connector 124a to successfully pass through the first hole 124a. In addition, in the present embodiment, the extending portion 1262b on the first tongue piece 1244 is overlapped with the driving circuit 160 on the first tongue piece 1244 in an orthogonal projection, and the extending portion 1262b is between the first tongue piece 1244 and the driving circuit 160. Part of the extending portion 1262b is accommodated in the first hole 124a, so that the first connector 1266 is disposed outside the bottom frame 124.

In the present embodiment, the first tongue piece 1244 has a screw hole 1244a, and the driver board 160 is locked on the first tongue piece 1244 via the screw hole 1244a with a lock accessory (not shown, such as a screw). In the present embodiment, circuits of the first connector 1266 on the first tongue piece 1244 are not overlapped with the screw hole 1244a in an orthogonal projection. Thereby, the lock accessory is prevented from passing through the circuit and destructing the circuit when passing through the screw hole 1244a. More specifically, the first connector 1266 includes a through hole 1266a disposed correspondingly to the screw hole 1244a, and the lock accessory passes through the through hole 1266a and the screw hole 1244a to lock the driver board 160 on the first tongue piece 1244. The circuit on the first connector 1266, for example, surrounds the through hole 1266a and avoids the through hole 1266a, so that the circuit on the first connector 1266 is able to avoid the position of the screw hole 1244a.

It should be noted that the reference numerals and a part of the contents in the previous embodiment are used in the following embodiments, in which identical reference numerals indicate identical or similar components, and repeated description of the same technical contents is omitted. For a detailed description of the omitted parts, reference can be found in the previous embodiment, and no description will be repeated in the following embodiments.

Figure 4:
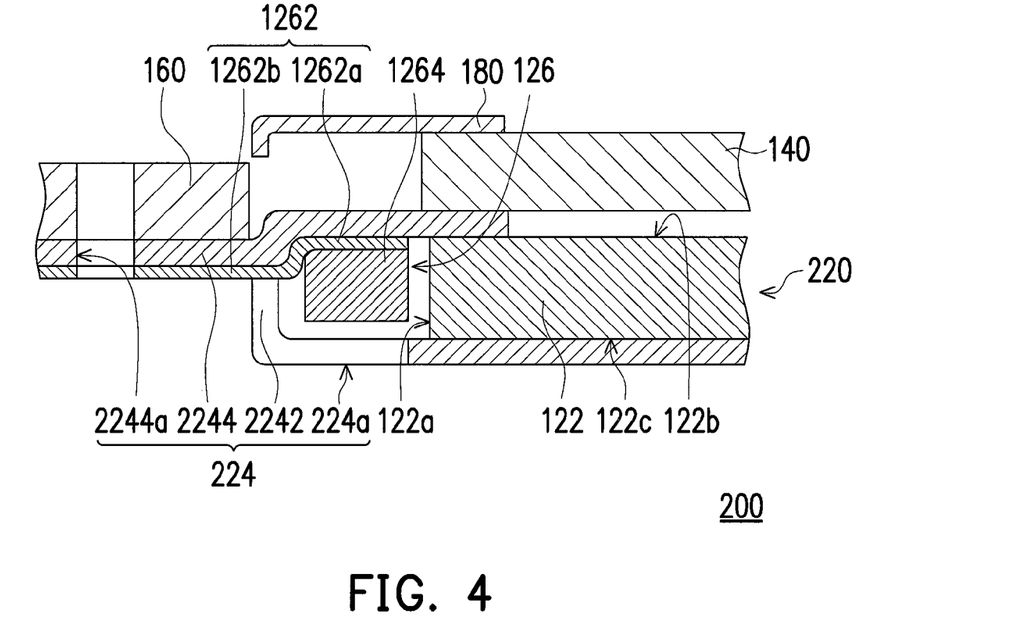
FIG. 4 is a schematic cross-sectional view of a display device according to another embodiment.

FIG. 4 is a schematic cross-sectional view of a display device according to another embodiment. The embodiment of FIG. 4 is similar to that of FIG. 1, and the embodiments differ primarily in the structure of the bottom frame. Referring to FIG. 4, in the present embodiment, a bottom frame 224 of a display device 200 has a clip portion 2242, a first tongue piece 2244 and a first hole 224a. In addition, a light guide 122 of the display device 200 has a first light incident surface 122a, a light-emitting surface 122b and a bottom surface 122c opposite to each other, wherein the first light incident surface 122a is adjacent to the light-emitting surface 122b and the bottom surface 122c, and the first hole 224a is at the bottom surface 122c. In other words, the first tongue piece 2244 is folded from the bottom surface 122c toward a direction away from the clip portion 2242, such as a direction away from the light guide 122 in FIG. 4. It is worth mentioning that in such an arrangement, the first tongue piece 2244 is between the extending portion 1262b and the driving circuit 160. In the present embodiment, adopting the first hole 224a formed to be as the cable hole when folding the bottom frame 224 to make up the first tongue piece 2244, the bottom frame 224 does not require an additional hole as the cable hole. Thereby, the number of holes on the bottom frame 224 is effectively reduced so that the backlight module 220 has favorable structural strength.

Figure 5:
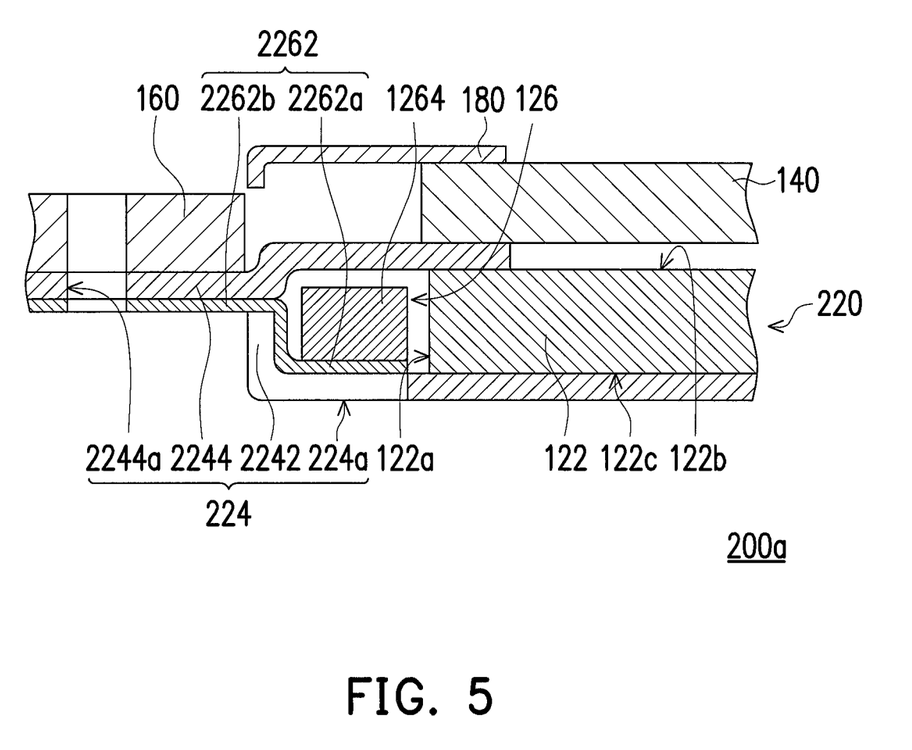
FIG. 5 is a schematic cross-sectional view of a display device according to another embodiment.

FIG. 5 is a schematic cross-sectional view of a display device according to another embodiment. The embodiment of FIG. 5 is similar to that of FIG. 4, and the embodiments differ primarily in the position of the flexible circuit board. In the present embodiment, a flexible circuit board 2262 of a display device 200a has a main body 2262a and an extending portion 2262b connected to each other, wherein a light source 1264 is disposed on the main body 2262a. As illustrated in FIG. 5, the main body 2262a shields the first hole 224a, so as to prevent light emitted from the light source 1264 from leaking out of the first hole 224a to have the effect of reducing light leakage.

According to the position and number of light bars and the number of connectors, the backlight module of the display module may take a plurality of forms, which are described with exemplary embodiments below.

Figure 6:
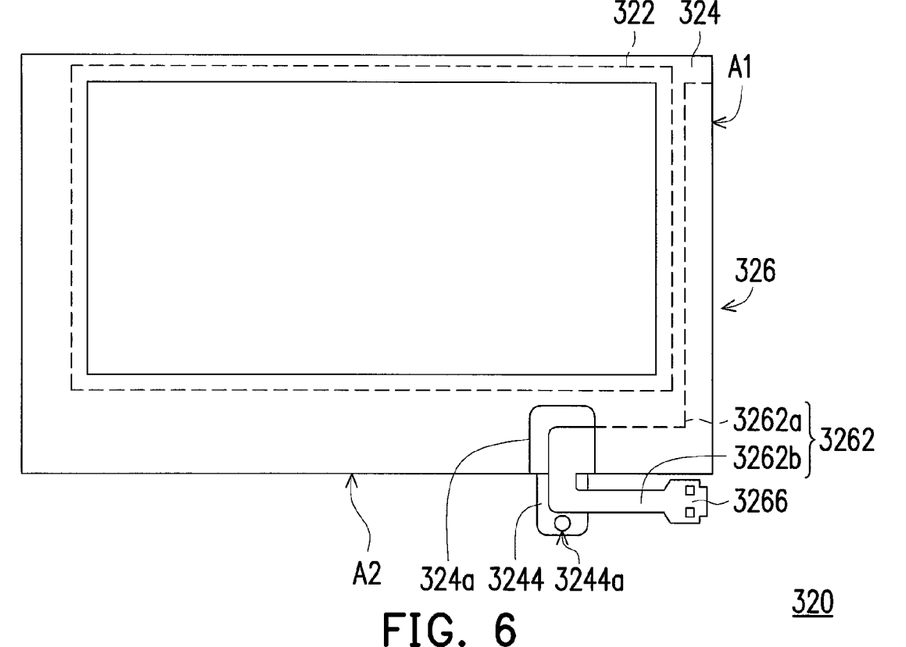
FIG. 6 is a schematic top view of a backlight module according to another embodiment.

FIG. 6 is a schematic top view of a backlight module according to another embodiment. Referring to FIG. 6, a backlight module 320 includes a light guide 322, a bottom frame 324 and a first light bar 326. The bottom frame 324 has a first hole 324a and a first tongue piece 3244, wherein the first tongue piece 3244 is folded from the first hole 324a, and the driver board (not shown) is screwed on the first tongue piece 3244. In addition, the bottom frame 324 has a first side surface A1 and a second side surface A2 connected to each other, and the present embodiment is described with the example that the first side surface A1 is perpendicular to the second side surface A2. The first light bar 326 has a flexible circuit board 3262 and a first connector 3266. The flexible circuit board 3262 has a main body 3262a and an extending portion 3262b connected to each other, and the first connector 3266 is disposed on the extending portion 3262b. In the present embodiment, a light source (not shown) is situated on the first side surface A1 and is disposed on the main body 3262a, and the first hole 324a is at the second surface A2.

As illustrated in FIG. 6, the main body 3262a of the flexible circuit board 3262 extends from the first side surface A1 of the bottom frame 324 to the second side surface A2 and appears in a L-like shape. In addition, a connecting portion 3262b penetrates through the first hole 324a of the second side surface A2 so that the first connector 3266 is outside the bottom frame 324. In the present embodiment, the light source and the first hole 324a are at different side surfaces of the bottom frame 324 (such as the first side surface A1 and the second side surface A2 in FIG. 6). The flexible circuit board 3262 extends along these side surfaces and have different shapes (such as the L-shape in FIG. 6), so that design of the backlight module 320 is more flexible. In the present embodiment, by disposing the first light bar 326 on a short side (the first side surface A1), the number of light sources is reduced, and meanwhile mura formed by spacings between the light sources is avoided.

It is worth mentioning that the first tongue piece 3244 of the present embodiment has a screw hole 3244a, and as illustrated in FIG. 6, the connecting portion 3262b keeps away from the screw hole 3244a, and the first connector 3266 on the first tongue piece 1244 is not overlapped with the screw hole 3244a in an orthogonal projection. Thereby, when the driver board is locked on the first tongue piece 3244 with a lock accessory such as a screw, the flexible circuit board 3262 is not affected.

Figure 7:
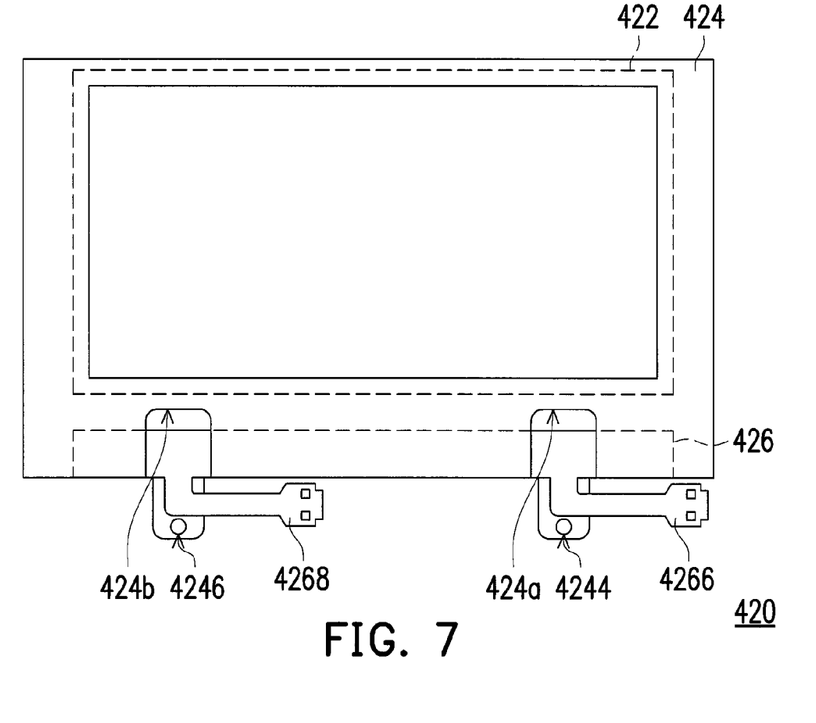
FIG. 7 is a schematic top view of a backlight module according to another embodiment.

FIG. 7 is a schematic top view of a backlight module according to another embodiment. Referring to FIG. 7, a backlight module 420 includes a light guide 422, a bottom frame 424 and a first light bar 426. The bottom frame 424 has a first hole 424a, a second hole 424b, a first tongue piece 4244 and a second tongue piece 4246, wherein the driver board is are locked on the first tongue piece 4244 and the second tongue piece 4246. In the present embodiment, the first tongue piece 4244 is folded from the first hole 424a, and the second tongue piece 4246 is folded from the second hole 424b. The first light bar 426 has a first connector 4266 and a second connector 4268, wherein the first connector 4266 passes through the first hole 424a, and the second connector 4268 passes through the second hole 424b. Increasing the number of connectors of the first light bar 426 provides the first light bar 426 with more contacts of electrical connection. The disclosure is certainly not limited to two connectors. In other embodiments, the first light bar 426 has more connectors so that the design is more flexible.

Figure 8:
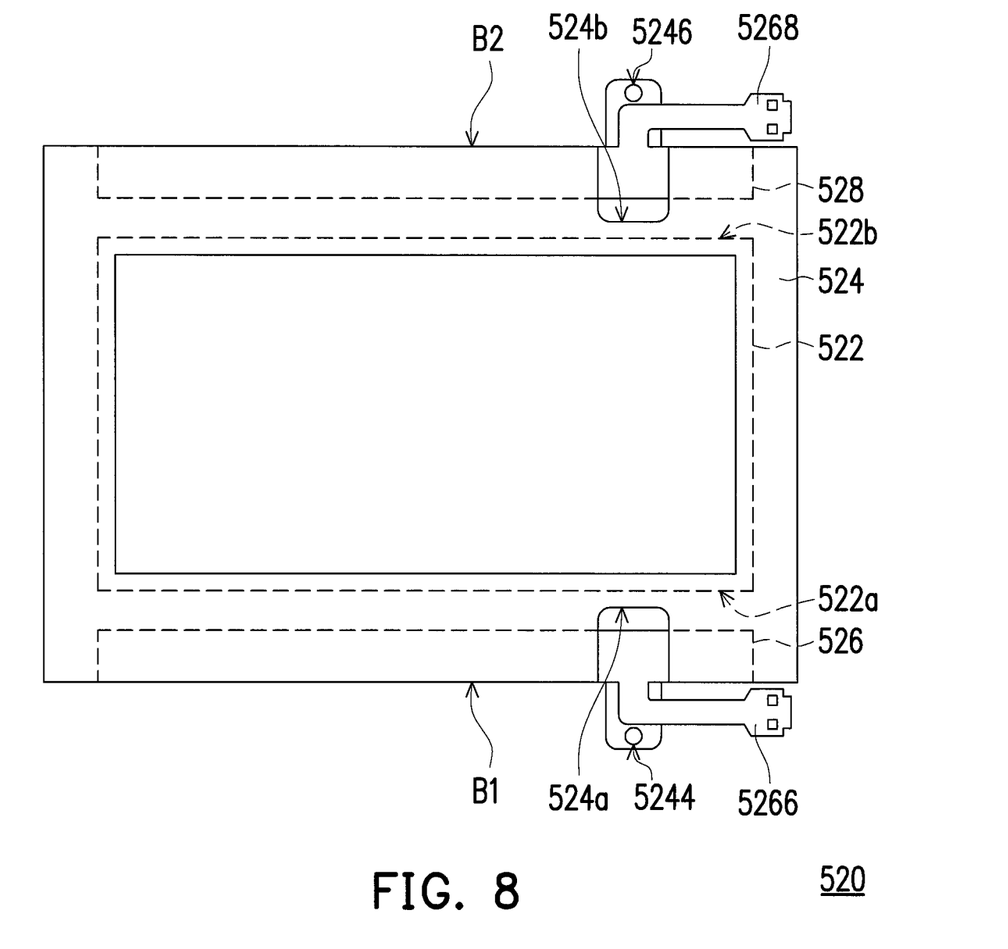
FIG. 8 is a schematic top view of a backlight module according to another embodiment.

FIG. 8 is a schematic top view of a backlight module according to another embodiment. Referring to FIG. 8, a backlight module 520 includes a light guide 522, a bottom frame 524, a first light bar 526 and a second light bar 528. The bottom frame 524 has a first hole 524a, a second hole 524b, a first tongue piece 5244 and a second tongue piece 5246, wherein the driver boards are locked respectively on the first tongue piece 5244 and the second tongue piece 5246. In the present embodiment, the first tongue piece 5244 is folded from the first hole 524a, and the second tongue piece 5246 is folded from the second hole 524b. The bottom frame 524 has a first side surface B1 and a second side surface B2 opposite to each other, wherein the first hole 524a is at the first side surface B1 and the second hole 524b is at the second side surface B2.

The light guide 522 has a first light incident surface 522a and a second light incident surface 522b at two opposite sides of the light guide 522, wherein the first light bar 526 is between the first side surface B1 and the first light incident surface 522a, and the second light bar 528 is between the second side surface B2 and the second light incident surface 522b. The backlight module 520 of the present embodiment includes a plurality of light bars 526 and 528, and the light bars 526 and 528 are at two opposite side surfaces B1 and B2 of the bottom frame 524. The tongue pieces are folded from bottom frame to form holes 524a and 524b in different side surface (B1-B2) chosen among the position of the light bar 526-528, so that the design of the backlight module 520 is more flexible. In the present embodiment, brightness is enhanced by the plurality of light bars 526 and 528.

In light of the above, the backlight module adopts the first hole formed as the cable hole when folding the bottom frame to form the first tongue piece, so that the bottom frame does not require an additional hole as the cable hole. Thereby, the number of holes on the bottom frame is effectively reduced so that the backlight module has favorable structural strength. In addition, adopting the backlight module having favorable structural strength in the display device further enhances the reliability of the display device.

On the other hand, there are different designs for the position and number of the light bars or the number of connectors in the backlight module, so that the backlight module and the display device having the backlight module have good flexibility in design.

Although the disclosure has been described with reference to the above embodiments, it will be apparent to one of ordinary skill in the art that modifications to the described embodiments may be made without departing from the spirit and scope of the disclosure. Accordingly, the scope of the disclosure will be defined by the attached claims and not by the above detailed descriptions.

What is claimed is:

1. A backlight module, comprising:
   a light guide, having a first light incident surface;
   a bottom frame, having a clip portion, a first hole, and a first tongue piece, wherein the light guide is disposed in the bottom frame and clipped by the clip portion, a driver board is locked to the first tongue, and the first tongue piece is folded from the first hole; and
   a first light bar, disposed between the first light incident surface of the light guide and the bottom frame, wherein the first light bar has a first connector, and the first connector passes through the first hole, so that the first connector is outside the bottom frame.

2. The backlight module as recited in claim 1, wherein the first connector has a first width, the first hole has a first diagonal width, and the first diagonal width is greater than or equal to the first width.

3. The backlight module as recited in claim 1, wherein the first tongue piece has a screw hole, and the first connector on the first tongue piece does not overlap with the screw hole in an orthogonal projection.

4. The backlight module as recited in claim 1, wherein the first tongue piece has a screw hole, and a circuit of the first connector on the first tongue piece does not overlap with the screw hole in an orthogonal projection.

5. The backlight module as recited in claim 1, wherein the bottom frame further has a second hole and a second tongue piece, the driver board is locked to the second tongue piece, the second tongue piece is folded from the second hole, the first light bar has a second connector, and the second connector passes through the second hole, so that the second connector is outside the bottom frame.

6. The backlight module as recited in claim 1, further comprising a second light bar, wherein the light guide further has a second light incident surface, the first light incident surface and the second light incident surface are at two opposite sides of the light guide, the bottom frame further has a second hole and a second tongue piece, the driver board is locked to the second tongue piece, the second tongue piece is folded from the second hole, the second light bar has a second connector, and the second connector passes through the second hole, so that the second connector is outside the bottom frame.

7. The backlight module as recited in claim 1, wherein the light guide further has a light-emitting surface and a bottom surface opposite to each other, the first light incident surface is adjacent to the light-emitting surface and the bottom surface, and the first hole is at the bottom surface.

8. The backlight module as recited in claim 1, wherein the light guide further has a light-emitting surface and a bottom surface opposite to each other, the first light incident surface is adjacent to the light-emitting surface and the bottom surface, and the first hole is at the light-emitting surface.

9. A display device, comprising:
   a backlight module as recited in any of claim 1;
   a display module, disposed on the backlight module;
   the driver board being electrically connected to the display module, and the backlight module being between the driver board and the display module; and
   a front frame, assembled with the bottom frame and covering the periphery of the display module.

10. A display device, comprising:
    a backlight module, comprising:
       a light guide, having a light incident surface and a light-emitting surface adjacent to each other;
       a bottom frame, having a clip portion, a first tongue piece and a first hole, wherein the first tongue piece is folded from the bottom frame to form the first hole, and the first tongue piece is connected to the clip portion while extending away from the clip portion; and
       a first light bar, having a flexible circuit board, a light source and a first connector, wherein the flexible circuit board has a main body and an extending portion connected to each other, the light source is disposed on the main body, and the first connector is at the extending portion;
    a display module, disposed on the backlight module; and
    a driver board electrically connected to the display module and disposed on the first tongue piece, wherein the main body is disposed in the clip portion, and the extending portion is disposed on the first tongue piece.

11. The display device as recited in claim 10, wherein part of the extending portion is accommodated in the first hole, so that the first connector is outside the bottom frame.

12. The display device as recited in claim 10, wherein the first hole matches the outer contour of the first tongue piece.

13. The display device as recited in claim 10, wherein the extending portion is between the first tongue piece and the driver board.

14. The display device as recited in claim 10, wherein the extending portion on the first tongue piece is overlapped with the driver board on the first tongue piece in an orthogonal projection.

* * * * *